(12) United States Patent
Kernwein et al.

(10) Patent No.: US 8,000,873 B2
(45) Date of Patent: Aug. 16, 2011

(54) BRAKING SYSTEM

(75) Inventors: Jeffrey D. Kernwein, Cedar Rapids, IA (US); James L. Fenske, Marian, IA (US)

(73) Assignee: Wabtec Holding Corp., Wilmerding, PA (US)

( * ) Notice: Subject to any disclaimer, the term of this patent is extended or adjusted under 35 U.S.C. 154(b) by 736 days.

(21) Appl. No.: 12/118,925

(22) Filed: May 12, 2008

(65) Prior Publication Data

US 2009/0281705 A1    Nov. 12, 2009

(51) Int. Cl.
*B60T 8/17* (2006.01)
(52) U.S. Cl. ............................... 701/76; 303/19
(58) Field of Classification Search .............. 701/76, 701/70, 71; 303/19
See application file for complete search history.

(56) References Cited

U.S. PATENT DOCUMENTS

| | | | |
|---|---|---|---|
| 4,107,253 A | 8/1978 | Borg et al. | |
| 4,496,193 A * | 1/1985 | Rumsey | 303/19 |
| 4,534,599 A | 8/1985 | Wright et al. | |
| 4,626,039 A | 12/1986 | Worbois | |
| 4,692,867 A | 9/1987 | Poole | |
| 5,721,683 A | 2/1998 | Joyce, Jr. et al. | |
| 5,817,934 A | 10/1998 | Skantar | |
| 5,862,048 A | 1/1999 | Knight | |
| 5,952,799 A | 9/1999 | Maisch et al. | |
| 6,120,109 A | 9/2000 | Wood et al. | |
| 6,126,247 A | 10/2000 | Paul et al. | |
| 6,302,495 B1 | 10/2001 | Peltz | |
| 6,318,811 B1 | 11/2001 | Root et al. | |
| 6,371,575 B1 | 4/2002 | Lewis et al. | |
| 6,375,276 B1 | 4/2002 | Delaruelle | |
| 6,648,422 B2 | 11/2003 | Root et al. | |
| 6,676,229 B1 | 1/2004 | Marra et al. | |
| 6,746,087 B1 | 6/2004 | Reynolds et al. | |
| 6,896,339 B2 | 5/2005 | Moffitt et al. | |
| 6,932,437 B1 | 8/2005 | Root et al. | |
| 7,073,753 B2 | 7/2006 | Root et al. | |
| 7,722,134 B2 * | 5/2010 | Kane | 303/128 |
| 7,896,135 B2 * | 3/2011 | Kattainen et al. | 187/248 |
| 2002/0147538 A1 | 10/2002 | Marra et al. | |
| 2002/0153766 A1 | 10/2002 | Kettle, Jr. | |
| 2003/0009274 A1 | 1/2003 | Peterson, Jr. et al. | |
| 2004/0006413 A1 | 1/2004 | Kane et al. | |
| 2004/0084957 A1 | 5/2004 | Root et al. | |
| 2004/0108771 A1 | 6/2004 | Tsunehara | |
| 2004/0122566 A1 | 6/2004 | Horst et al. | |
| 2005/0027410 A1 | 2/2005 | Kanner et al. | |

(Continued)

FOREIGN PATENT DOCUMENTS

JP    2005280569 A    10/2005

(Continued)

*Primary Examiner* — Kevin Hurley
(74) *Attorney, Agent, or Firm* — The Webb Law Firm (57) ABSTRACT

A braking system, including a brake control arrangement in operational communication with a braking arrangement for braking a vehicle, and a penalty power source to deliver current or power to the brake control arrangement through a brake interface circuit. The brake interface circuit includes a main positive current switch urged to a closed position and configured to open upon loss or interruption of a penalty hold-off signal, and a main negative current switch urged to a closed position and configured to open upon loss or interruption of a penalty hold-off signal. Upon opening of either of the main positive current switch or the main negative current switch, the braking arrangement will automatically brake the vehicle as controlled by the brake control arrangement.

23 Claims, 2 Drawing Sheets

U.S. PATENT DOCUMENTS

| | | |
|---|---|---|
| 2005/0085960 A1 | 4/2005 | Lumbis et al. |
| 2005/0099061 A1 | 5/2005 | Hollandsworth et al. |
| 2005/0173974 A1 | 8/2005 | Fuderer et al. |
| 2006/0076826 A1 | 4/2006 | Kane |
| 2007/0063578 A1 | 3/2007 | Reynolds et al. |
| 2007/0063581 A1 | 3/2007 | Teifke et al. |
| 2007/0164607 A1 | 7/2007 | Itoh |

FOREIGN PATENT DOCUMENTS

| | | |
|---|---|---|
| KR | 100274297 B1 | 12/2000 |

* cited by examiner

BRAKING SYSTEM

BACKGROUND OF THE INVENTION

1. Field of the Invention

The present invention relates generally to braking systems and arrangements for vehicles, such as trains and, in particular to a braking system for providing control and monitoring functions in a penalty brake arrangement for stopping the vehicle in specified situations or under specified conditions.

2. Description of the Related Art

In order to slow or stop a vehicle traversing a path, a braking system is employed. When used in connection with trains, trucks, subways, buses and other mass transit vehicles, these braking systems are often complex braking arrangements. Further, these arrangements often include certain failsafe components or controls in order to ensure that the vehicle may be slowed or stopped in a variety of situations, e.g., equipment failure, control system failure, operator error or loss of vigilance, emergency conditions, etc. The portions that are used in these "emergency" or automated braking situations are often referred to as penalty braking systems or arrangements.

With specific reference to trains, and as is known in the art, in order to safely traverse a track in a track network, a train includes a complex braking arrangement situated over multiple cars for use in safely slowing and/or stopping the train in specified situations. Normally, the braking system on such trains is a pneumatically-driven arrangement having mechanisms and components that interact with each railroad car attached to the engine(s). For example, in one known braking arrangement for a train, an operator of the train has control over the braking arrangement through the use of an operator control valve. Through the movement of a lever associated with the control valve, the operator can adjust the amount of braking to be applied in the braking arrangement. The higher the braking force selected, the faster the braking arrangement will attempt to slow and stop the train. Compressed air is supplied through the control valve to a brake pipe that extends along and is associated with each railcar. Each car includes an arrangement that allows an auxiliary reservoir to be charged with air via a valve, as well as a brake cylinder that is in communication with the valve. The brake cylinder is operable to urge a brake shoe mechanism against a surface of the wheel, thus slowing or stopping the train.

While control over the braking arrangement by the operator is preferred and normally implemented, many braking systems utilize a brake interface in communication with a brake control component that permits automated, semi-automatic or penalty braking to occur. For example, in many automated train control systems, e.g., a Positive Train Control (PTC) system (e.g., the Electronic Train Management System (ETMS) of Wabtec), an Automated Train Control (ATC) system, etc., a brake interface (circuit) is in operable communication with the locomotive braking arrangement for the purpose of stopping the train in the event of an unsafe condition that may either exist at the current point in time (e.g., overspeed), or is predicted to exist in the future (e.g., violation of an upcoming authority limit). This brake interface is often considered a critical component of the overall braking system, and should preferably have some form of redundancy in order to meet the safety levels expected by the railroad industry and associated regulating bodies.

These train control systems can be used in connection with a variety of types of braking arrangements, such as the pneumatically-driven arrangement discussed above. Further a typical locomotive braking system that includes the brake interface (circuit) falls into one of two categories. The first type is an electronic braking system that requires an electrically-isolated voltage source driving a "vital" input on the electronic air brake computer or controller. In this arrangement, the brake control arrangement (or brake input), which is in communication with the braking arrangement, requires some voltage or current that holds the brakes from applying. If the input voltage drops to zero, the braking arrangement will apply at a full service rate and stop the train.

Another type of braking system includes a brake control arrangement in the form of a normally-open electrically-controlled pneumatic valve, commonly referred to as a "P2A" valve. This type of control arrangement is utilized in connection with traditional non-electronic air brake locomotives, and this arrangement operates in a manner similar to the electric input arrangement discussed above, where electrical current in the circuit closes the valve and holds the brakes from applying. In particular, if the voltage or current drops to zero, the pneumatic valve will open and the braking arrangement will apply and bring the train to a complete stop.

It is known in braking systems, and in particular to brake interfaces for locomotives, to supply power from a penalty power source through a circuit to a brake control arrangement (whether direct input in the electronics, or through the brake input in the from of an electrically-controlled pneumatic valve), which is in operational communication with the braking arrangement. As discussed above, when the voltage drops to zero at the control arrangement input, the brake control arrangement implements a full service rate application of the braking arrangement. Accordingly, such an arrangement is vital to the safe operation and control of the train (or any vehicle where such an arrangement is utilized).

Further, and in general, there exist different train control systems and methods for braking and/or controlling trains. For example, see U.S. Pat. Nos. 7,073,753 to Root et al.; 6,932,437 to Root et al.; 6,896,339 to Moffitt et al.; 6,746,087 to Reynolds et al.; 6,676,229 to Marra et al.; 6,648,422 to Root et al.; 6,375,276 to Delaruelle; 6,371,575 to Lewis et al.; 6,318,811 to Root et al.; 6,302,495 to Peltz; 6,126,247 to Paul et al.; 6,120,109 to Wood et al.; 5,862,048 to Knight; 5,817,934 to Skantar; 5,721,683 to Joyce, Jr. et al.; 4,692,867 to Poole; 4,626,039 to Worbois; 4,534,599 to Wright et al.; and 4,107,253 to Borg et al. Also, see Patent Publication Nos.: 2007/0063581 to Teifke et al.; 2007/0063578 to Reynolds et al.; 2006/0076826 to Kane; 2005/0173974 to Fuderer et al.; 2005/0099061 to Hollandsworth et al.; 2005/0085960 to Lumbis et al.; 2005/0027410 to Kanner et al.; 2004/0122566 to Horst et al.; 2004/0084957 to Root et al.; 2004/0006413 to Kane et al.; 2003/0009274 to Peterson, Jr. et al.; 2002/0153766 to Kettle, Jr.; and 2002/0147538 to Marra et al.

Therefore, there exist prior art electronic and/or pneumatic braking and control systems, however, such known systems exhibit various drawbacks and deficiencies in both development and implementation. For example, since brake interface systems (and braking arrangements in general) are vital to the safe operation of the vehicle, certain redundancies and checks to ensure proper, timely and effective operation of the braking arrangement in an emergency or other specified situation is of the utmost importance. Known prior art systems operate to implement a full service rate application of brakes when voltage or current in the brake control arrangement drops to zero. However, such systems do not include further controllable aspects, functions and components that provide additional, beneficial backup and insurance of proper brake application in certain situations. In addition, there remains a need in the art for functions and features that permit the brake interface (circuit) to be tested for appropriate operation, without actually implementing an emergency "stop" of the train. Still further, many of these prior art systems and methods are amenable to further augmentation or beneficial functioning in order to provide safer braking arrangements on mass transit vehicles, such as trains and the like. As one would expect, the safe operation of such vehicles is a necessity for protecting the operator, crew, motorists, pedestrians, etc.

SUMMARY OF THE INVENTION

It is, therefore, an object of the present invention to provide a braking system that overcomes the drawbacks and deficiencies of the prior art in the field of braking arrangement design. It is another object of the present invention to provide a braking system that provides redundant control of braking arrangements, brake interfaces and similar circuits. It is yet another object of the present invention to provide a braking system that provides for the appropriate testing of the circuitry and operability of certain components and systems of a brake arrangement of a vehicle. It is another object of the present invention to provide a braking system that increases the likelihood of an automated implementation of a braking arrangement under specified conditions and situations. It is a still further object of the present invention to provide a braking system that is useful in connection with a variety of mass transit and carrier vehicles, e.g., trains and the like.

Accordingly, provided is a braking system that includes a brake control arrangement in operational communication with a braking arrangement for braking a vehicle. A penalty power source delivers current to the brake control arrangement through a brake interface circuit. The brake interface circuit includes: a main positive current switch in a path between the penalty power source and the brake control arrangement, the main positive current switch urged to a closed position and operable to open upon loss or interruption of a penalty hold-off signal; and a main negative current switch in a path between the penalty power source and the brake control arrangement, the main negative current switch urged to a closed position and operable to open upon loss or interruption of a penalty hold-off signal. Upon opening either of the main positive current switch or the main negative current switch, the braking arrangement will automatically brake the vehicle as controlled by the brake control arrangement.

Further, provided is a method of controlling a braking system having a brake control arrangement in operational communication with a braking arrangement for braking a vehicle. The method includes: delivering current from a penalty power source to the brake control arrangement; positioning a main positive current switch in a path between the penalty power source and the brake control arrangement; urging a main positive current switch to a closed position; upon loss or interruption of a penalty hold-off signal, actuating the main positive current switch to an open position; urging a main negative current switch to a closed position; upon loss or interruption of a penalty hold-off signal, actuating the main negative current switch to an open position; upon opening of either of the main positive current switch or the main negative current switch, automatically braking the vehicle as controlled by the brake control arrangement.

Still further, provided is a brake interface circuit for facilitating electrical communication between a brake control arrangement, which is in operational communication with a braking arrangement for slowing or stopping a vehicle, and a penalty power source for delivering current to the brake control arrangement through the brake interface circuit. The brake interface circuit includes: a main positive current switch in a path between the penalty power source and the brake control arrangement, the main positive current switch urged to a closed position and operable to open upon loss or interruption of a penalty hold-off signal; and a main negative current switch in a path between the penalty power source and the brake control arrangement, the main negative current switch urged to a closed position and operable to open upon loss or interruption of a penalty hold-off signal.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE PREFERRED EMBODIMENTS

It is to be understood that the invention may assume various alternative variations and step sequences, except where expressly specified to the contrary. It is also to be understood that the specific devices and processes illustrated in the attached drawings, and described in the following specification, are simply exemplary embodiments of the invention.

According to the present invention, provided is a braking system 10 and method for use in connection with a vehicle V having a braking arrangement BA for slowing or stopping the vehicle V. Schematic representations of various embodiments of the braking system 10 are illustrated in FIGS. 1-5. While the braking system 10 and method of the present invention is specifically discussed herein with connection to a pneumatically-driven arrangement (air brakes), it is equally applicable and useful in connection with a variety of braking arrangements BA and applications involving vehicles V with complex braking systems. As discussed above, and as discussed hereinafter, one primary goal is to provide a braking system 10 for use in connection with a train or railcar, however, the braking system 10 and method may also be used in connection with roadway or rail-based vehicles V and mass transit or transportation vehicles V (e.g., cars, trucks, subways, buses, etc) that require a redundant and controlled braking system and braking arrangement BA.

For example, many of these vehicles V include similar braking arrangements BA that use brake shoe mechanisms operable to be in direct or indirect contact with a wheel for use in slowing or stopping the vehicle V. Regardless of application or type of vehicle V, and due to the regulatory and industry requirements and consumer expectations to operate such vehicles V in a heightened state of safety (with requisite braking, control and backup systems), additional safety measures, functions and components are always warranted to meet these requirements and expectations. Therefore, while predominantly discussed in connection with railway vehicles, all similar applications and vehicles V are envisioned and may be used in connection with the braking system 10 and method of the present invention.

Similarly, the braking system 10 and method of the present invention can be used in a variety of types of braking arrangements BA and braking systems used in the railroad industry. For example, the system 10 and method can be used in connection with electronically-controlled pneumatic brakes, dynamic braking systems, blended or combination braking systems, emergency braking systems, etc. As discussed above, regardless of the control and operation within the braking system 10 (whether manual, automatic or semi-automatic), all such braking arrangements BA and systems are amenable to additional and beneficial augmentation, which is accomplished through full or partial implementation of the presently-invented braking system 10 and method of controlling a braking system 10.

Figure 1:
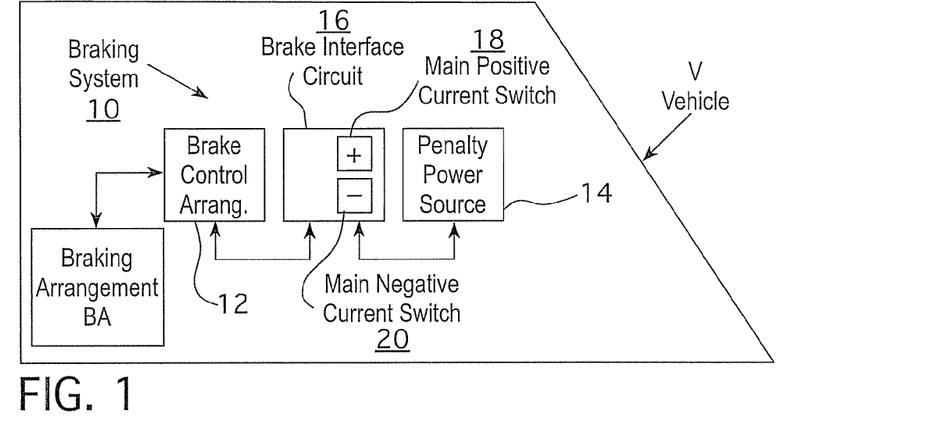
FIG. 1 is a schematic view of one embodiment of a braking system according to the principles of the present invention.

As illustrated in FIG. 1, and in one preferred and non-limiting embodiment where the vehicle V is a train, the braking system 10 includes a brake control arrangement 12, which is in operational communication with the braking arrangement BA that brakes, stops or slows the vehicle V. As discussed above, this brake control arrangement 12 may take a variety of different forms dependent upon the type of brake system used and implemented on a vehicle V, as well as the type of braking arrangement BA and configuration thereof. Accordingly, the brake control arrangement 12 can be an airbrake input in the form of a direct electronic input into an electronic airbrake system, or an electronically-controlled pneumatic valve (P2A). In either case, when the voltage or current drops to zero in either configuration of the brake control arrangement 12, this condition causes the braking arrangement BA to automatically stop the vehicle V by fully applying various components of the brake arrangement BA, e.g., fully applying the brake shoe mechanisms against the wheel of the vehicle V.

As also illustrated in FIG. 1, current or power is delivered to the brake control arrangement 12 from a penalty power source 14 through a brake interface circuit 16. Accordingly, and as discussed, a "break" or interruption in the delivery of power through this brake interface circuit 16 would cause the voltage to drop to zero at the brake control arrangement 12, thereby causing a full service rate application of the braking arrangement BA of the vehicle V.

In this embodiment, the brake interface circuit 16 includes a main positive current switch 18 positioned or located in a path, i.e., electrical communication, between the penalty power source 14 and the brake control arrangement 12. This path may be considered the source, "positive" or delivery path, and on this path, the main positive current switch 18 is urged to a closed position, and opens upon loss or interruption of a penalty hold-off signal. Accordingly, the main positive current switch 18 is a "fail open" switch, and may be an electro-mechanical switch, a solid state switch, etc.

Based upon the loss or interruption of the penalty hold-off signal at the main positive current switch 18, the voltage will drop to zero at the brake control arrangement 12. Accordingly, and through the brake control arrangement 12, the braking arrangement BA is actuated or energized to fully apply the braking or stopping function (as is known in the art). Therefore, and based upon this loss or interruption of signal, an emergency stop of the vehicle V will occur.

As further illustrated in FIG. 1, the braking system 10 includes a main negative current switch 20. As with the main positive current switch 18, the main negative current switch 20 is also in a path between the penalty power source 14 and the brake control arrangement 12. However, the main negative current switch 20 is in the "negative" or return path between the penalty power source 14 and the brake control arrangement 12. The main negative current switch 20 is also urged to a closed position, and will open upon loss or interruption of the penalty hold-off signal applied at the switch 20. Accordingly, and upon the loss or interruption of the penalty hold-off signal, the main negative current switch 20 will open and the vehicle V will be braked as discussed above in connection with the main positive current switch 18.

Accordingly, the penalty hold-off signal is a signal that controls state of the main positive current switch 18 and the main negative current switch 20. This penalty hold-off signal may be the same signal, or a different or separate signal, and may be transmitted from a microcontroller or similar control unit (as discussed hereinafter in connection with certain preferred and non-limiting embodiments). Further, the penalty hold-off signal may be in the form of a specified charge or voltage applied and used to control the main positive current switch 18 and the main negative current switch 20, which may be solid state, controllable switches. In any case, upon loss or interruption of the penalty hold-off or "control" signal, the main positive current switch 18 and/or the main negative current switch 20 opens, thereby interrupting the power delivered by the penalty power source 14 to the brake control arrangement 12. Upon loss of power or current at the brake control arrangement 12, the braking arrangement BA is engaged or actuated.

In this manner, an emergency and automated braking function occurs upon the loss or interruption of the penalty hold-off signal in either path (positive (source) or negative (return)) between the penalty power source 14 and the brake control arrangement 12. Accordingly, the brake interface circuit 16 (and braking system 10) of the present invention provides additional redundancies and is safer than a "single switch" approach, where both the source and return switches must fail in order to have or predict an "unsafe" condition.

Figure 2:
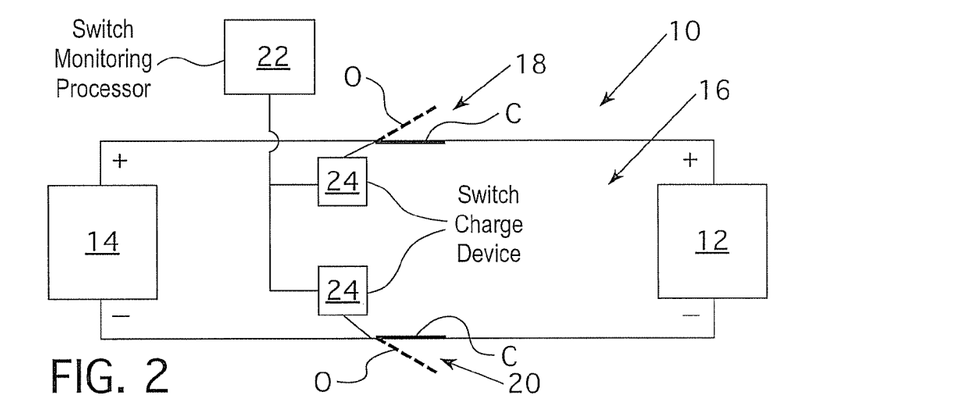
FIG. 2 is a schematic view of another embodiment of a braking system according to the principles of the present invention.

A further preferred and non-limiting embodiment of the braking system 10 of the present invention is illustrated in FIG. 2. In this embodiment, at least one (and possibly multiple) switch monitoring processors 22, which may be in the form of microcontrollers, are included to control the main positive current switch 18 and/or the main negative current switch 20 through delivery of the penalty hold-off signal. Further, such switch monitoring processors 22 are used to controllably open or close the main positive current switch 18 and/or the main negative current switch 20. In this manner, the switch monitoring processors 22 may include the appropriate logic or programming to command a brake application independent from the above-discussed application using an applied penalty hold-off signal. By using a separate switch monitoring processor 22, an additional level of redundancy is provided to this vital braking system 10 by allowing independent monitoring and control of the main positive current switch 18 and/or the main negative current switch 20.

Figure 3:
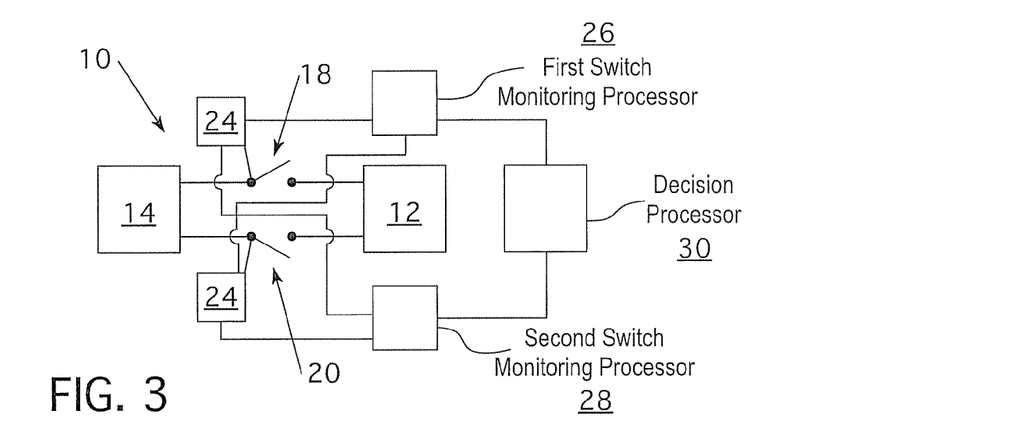
FIG. 3 is a schematic view of a further embodiment of a braking system according to the principles of the present invention.

In order to electronically and physically open or close the main positive current switch 18 and/or the main negative current switch 20, the switch monitoring processor 22 may be in communication with one or more switch charge devices 24, as illustrated in the preferred and non-limiting embodiment of FIG. 3. In this embodiment, each of the main positive current switch 18 and the main negative current switch 20 is in communication with a respective switch charge device 24, and each switch charge device 24 is used to apply a periodic charge (penalty hold-off signal) to the respective switch 18, 20. This charge urges the main positive current switch 18 and/or the main negative current switch 20 to a closed position. If the charge or signal is lost, the switch 18, 20 opens and the braking system 10 (in communication with the braking arrangement BA) effectively slows and stops the vehicle V.

In this embodiment, a first switch monitoring processor 26 and a second switch monitoring processor 28 are used. Each of these switch monitoring processors 26, 28 are in communication with both the switch charge devices 24, which are in electrical communication with the respective main positive current switch 18 and main negative current switch 20. Since the switch charge devices 24 must refresh the charge (or signal) applied to the switch 18, 20 on a periodic basis, if this input or charge is not refreshed within a predetermined time frame, it may be assumed that either the switch charge device 24 has failed, or the switch monitoring processor 26, 28 is not working properly. In addition, if the charge or input is refreshed too quickly, it may also be assumed that either the switch charge device 24 and/or at least one of the switch monitoring processors 26, 28 is not functioning correctly, such that the brakes may not effectively apply in an emergency situation. Accordingly, the switch monitoring processors 26, 28 and switch charge devices 24 must be servicing the brake interface circuit 16 at regular and predictable intervals in order to prevent a penalty brake application from occurring. This approach provides an additional fail-safe characteristic to the braking system 10 of the present invention, and protects from faulty switch charge device 24 or switch monitoring processor 26, 28 behavior.

A variety of penalty data may be obtained by the switch monitoring processors 26, 28 in order to make appropriate decisions regarding the application of the penalty braking process via the brake control arrangement 12. For example, such penalty data may include the amount of charge applied to a switch device 18, 20, the duration of the charge applied to the switch device 18, 20, the frequency of the charge applied to the switch device 18, 20, the presence of charge, the absence of charge, a function of at least one component of the vehicle V, a condition of at least one component of the vehicle V, switch data; fault data, message data, processor data, on-board controller data, central dispatch system data, vehicle data, position data, condition data, etc. Accordingly, a variety of monitored or sensed conditions or characteristics can be used to "request" that the switch monitoring processors 26, 28 open the switch 18, 20 (or cease delivery of the penalty hold-off signal), thus causing the brake control arrangement 12 to implement a full service rate stop of the vehicle V via the braking arrangement BA.

As illustrated in FIG. 3, the first switch monitoring processor 26 can be in communication with both the main positive current switch 18 and the main negative current switch 20, and the second switch monitoring processor 28 may also be in communication with both switches 18, 20. However, it is further envisioned that each switch monitoring processor 26, 28 is in communication with a respective switch 18, 20 in order to facilitate location and isolation of improper or faulty processor 26, 28 interaction or switch charge device 24 operation. In addition, it is envisioned that the switch monitoring processor 26, 28 may be integrated with or part of the switch charge devices 24, and configured to apply the appropriate charge to the switches 18, 20. Still further, the switch monitoring processors 26, 28 may take a variety of known controller forms that are programmable, configurable and operable to communicate with and implement the discussed braking system 10 and operation thereof.

As further illustrated in FIG. 3, and where the first switch monitoring processor 26 and second switch monitoring processor 28 are used, a decision processor 30 may be used and placed in communication with these switch monitoring processors 26, 28. In particular, this decision processor 30 is capable of receiving and processing processor data from these switch monitoring processors 26, 28 directed to the appropriate operation and configuration of these switch monitoring processors 26, 28. Therefore, if one of these switch monitoring processors 26, 28 fails or otherwise enters a "fault" condition, the decision processor 30 may decide to change operation and control of the main positive current switch 18 and/or the main negative current switch 20 to the other processor 26, 28. This provides an additional level of backup to the braking system 10 as the decision processor 30 is programmed, configured or operable to assess the data received by, processed by or transmitted from the various switch monitoring processors 26, 28. This decision processor 30 is operable to make decisions regarding the control of the main positive current switch 18 and/or main negative current switch 20 by deciding which switch monitoring processor 26, 28 and/or switch charge device 24 to use based upon the processor data. This ensures that a penalty brake application will not occur unless certain compromising failures are detected in some (or in some instances all) of the various components of the brake interface circuit 16, and further ensures that the penalty brake application will occur under the specified conditions.

Figure 4:
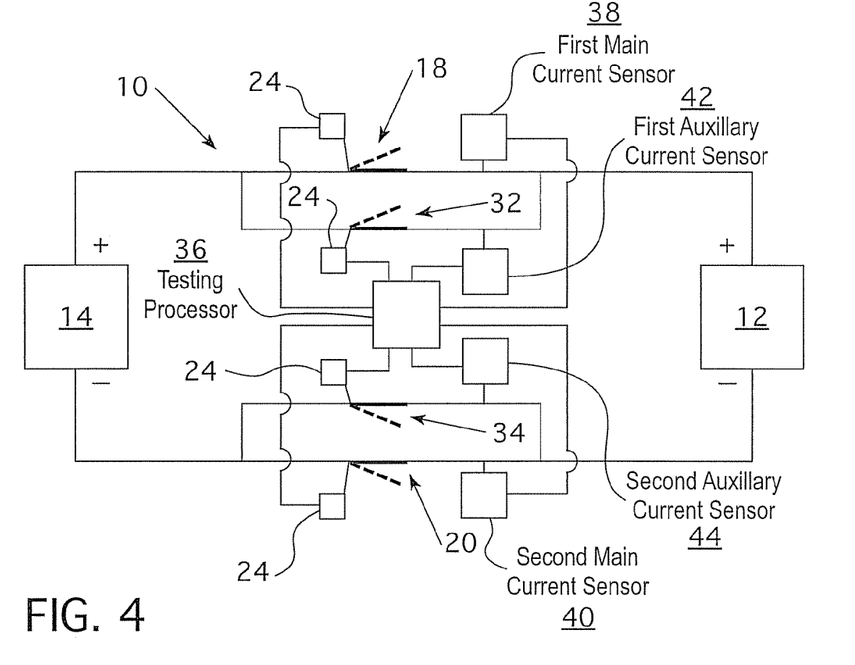
FIG. 4 is a schematic view of a still further embodiment of a braking system according to the principles of the present invention.

A further preferred and non-limiting embodiment of the presently-invented braking system 10 is illustrated in FIG. 4. In this embodiment, the braking system 10 includes an auxiliary positive current switch 32 in the positive current path between the penalty power source 14 and the brake control arrangement 12. In addition, the auxiliary positive current switch 32 is located in a path that is alternative to or passes around the main positive current switch 18, and this auxiliary positive current switch 32 is controllable between an open and closed position. In this embodiment, the system also includes an auxiliary negative current switch 34 in the negative current path between the penalty power source 14 and the brake control arrangement 12. As with the auxiliary positive current switch 32, the auxiliary negative current switch 34 is located in a path that is alternative to or around the main negative current switch 20. Further, this auxiliary negative current switch 34 is controllable between an open position and a closed position. Therefore, in this arrangement, the positive current and negative current from the penalty power source 14 can be routed around the main positive current switch 18 and/or main negative current switch 20 in these alternate paths and through the respective auxiliary positive current switch 32 and auxiliary negative current switch 34.

In this embodiment, the braking system 10 also includes a testing processor 36. The testing processor 36 controls the auxiliary positive current switch 32 and auxiliary negative current switch 34, such that the testing processor 36 is operable to open or close the auxiliary positive current switch 32 and auxiliary negative current switch 34, such as through application of an auxiliary control signal. Still further, the testing processor 36 is in communication with and operable to control the main positive current switch 18 and main negative current switch 20, such that these switches 18, 20 can be opened or closed based upon a command or request from the testing processor 36, such as through a main control signal. Of course, such control of the switches 18, 20, 32, 34 may be directly from the electrical communication or application of charge from the testing processor 36, or through some switch charge device 24 in electrical communication with the respective switch 18, 20, 32, 34.

By using the testing processor 36, the auxiliary positive current switch 32 and auxiliary negative current switch 34, the implementation of a testing routine or process can be implemented in the braking system 10. In one embodiment, the testing process 36 is configured or operable to close the auxiliary positive current switch 32 and the auxiliary negative current switch 34. After the switches 32, 34 have been closed (thus ensuring that both positive and negative current are flowing to and from the brake control arrangement 12 from the penalty power source 14 to avoid unwarranted brake application), the testing processor 36 requests (either directly or indirectly through another processor) that the main positive current switch 18 and/or the main negative current switch 20 be opened. Of course, this request may also be that the switch charge device 24 cease applying an appropriate charge (or the penalty hold-off signal) to the switch 18, 20. In either case, if the switch 18, 20 does not open, this would indicate some failure either within the switch 18, 20, the switch charge device 24 and/or the switch monitoring processor 22. The exact nature and precise location of the "failed" component can be determined from the data returned to the testing processor 36 from the request.

In this manner, the ability of the main positive current switch 18 and/or the main negative current switch 20 to open (and therefore the successful ability of the braking system 10 to apply a penalty brake to the vehicle V) can be effectively tested, checked and determined for appropriate operational configuration. However, even to the extent that the switches 18, 20 are operating appropriately and do open, an emergency braking condition does not occur, since power (both positive and negative current) are being delivered to the brake control arrangement 12 through the closed switches and alternate paths of the auxiliary positive current switch 32 and auxiliary negative current switch 34.

While a number of testing scenarios are envisioned regarding identifying and determining the possibility of a "failed" switch 18, 20 or component associated therewith, in one preferred and non-limiting embodiment, the braking system 10 includes a first main current sensor 38 in communication with the testing processor 36 and positioned in the path between the main positive current switch 18 and the brake control arrangement 12. This first main current sensor 38 is used to measure current in the path and provide current data to the testing processor 36 for determining whether the main positive current switch 18 has appropriately opened upon command. Similarly, a second main current sensor 40 is in communication with a testing processor 36 and positioned in the path between the main negative current switch 20 and the brake control arrangement 12. As discussed above in connection with the first main current sensor 38, the second main current sensor 40 measures negative current in the path between the main negative current switch 20 and the brake control arrangement 12, and provides appropriate current data to the testing processor 36 regarding the actuation condition of the main negative current switch 20. Based upon this current data, the testing processor 36 can make a threshold determination that there is a failure point in the brake interface circuit 16, and provide appropriate communication to the operator for maintenance.

In a further preferred and non-limiting embodiment, and as also illustrated in FIG. 4, the braking system 10 may also include a first auxiliary current sensor 42 in communication with the testing processor 36 and positioned in the path between the auxiliary positive current switch 32 and the brake control arrangement 12. This first auxiliary current sensor 42 measures current in this path and provides current data to the testing processor 36. Similarly, a second auxiliary current sensor 44 is in communication with the testing processor 36 and positioned in a path between the auxiliary negative current switch 34 and the brake control arrangement 12. As discussed, this second auxiliary current sensor 44 measures current in the path in which it is positioned and provides current data to the testing processor 36. As discussed hereinafter, the use of these sensors 42, 44 ensure that the auxiliary system is operable prior to controlling the main switches 18, 20. Again, as the penalty braking application, as implemented in the braking system 10, is an automated and full service rate stop of the vehicle V, it should be avoided unless there exists certain specified conditions and situations.

In operation, and prior to controlling the main positive current switch 18 (or requesting the control or actuation of this switch 18), the processor 36 closes the auxiliary positive current switch 32 and obtains current data from the first auxiliary current sensor 42. If the current data indicates that the presence of appropriate positive current in the path between the auxiliary positive current switch 32 and the brake control arrangement 12 exists, the request can then be transmitted to open the main positive current switch 18. Thereafter, the current data is obtained from the first main current sensor 38.

Similarly, and prior to controlling or requesting the control of the main negative current switch 20, the processor 36 closes the auxiliary negative current switch 34 and obtains current data from the second auxiliary current sensor 44. As discussed, if the current data indicates the presence of appropriate negative current in the path between the auxiliary negative current switch 34 and the brake control arrangement 12, the processor 36 instructs or transmits a request to open the main negative current switch 20. Thereafter, current data is obtained from the second main current sensor 40.

Accordingly, unnecessary application of the penalty braking process is avoided using the testing processor 36 and the results obtained from processing the current data (of the sensors 42, 44). In this embodiment, only after it is determined that the appropriate positive and negative current are flowing to and from the brake control arrangement 12 from the penalty power source 14 is any request or control operation implemented at the main positive current switch 18 and/or main negative current switch 20. Further, if some additional failure in the system occurs or conditions necessitate, the auxiliary positive current switch 32 and/or the auxiliary negative current switch 34 can be actuated as discussed above in connection with the main positive current switch 18 and the main negative current switch 20 to cause the braking arrangement BA to apply via the brake control arrangement 12. Accordingly, the auxiliary switches 32, 34 can be used as a temporary backup system if either of the main switches 18, 20 fail, thus ensuring that the penalty braking process will function appropriately under operating conditions.

Figure 5:
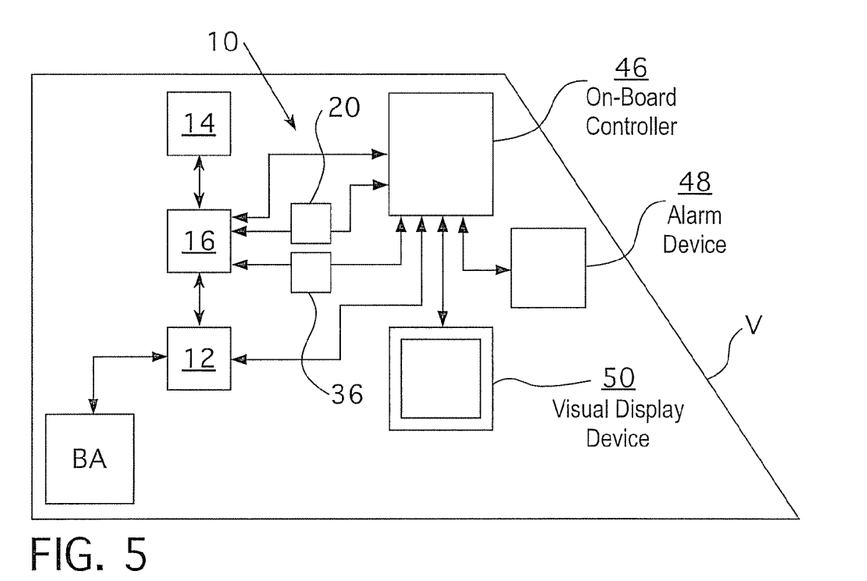
FIG. 5 is a schematic view of another embodiment of a braking system according to the principles of the present invention.

In a further preferred and non-limiting embodiment, and as illustrated in FIG. 5, the braking system 10 may also include an on-board controller 46 positioned on the vehicle V and in communication with the braking system 10, the brake control arrangement 12, the braking arrangement BA, the penalty power source 14, the brake interface circuit 16, the main positive current switch 18, the main negative current switch 20, the switch monitoring processor 22, the switch charge device 24, the auxiliary positive current switch 32, the auxiliary negative current switch 34, the testing processor 36, the sensor 38, 40, 42, 44, etc. In addition, and as discussed hereinafter, this on-board controller 46 may be in communication with an alarm device 48, a visual display device 50, the decision processor 30, a central dispatch system, etc. Accordingly, in this embodiment, the on-board controller 46 serves as the main control processor for operating the various components and implementing the functions of the vehicle V and/or the braking system 10. This on-board controller 46 may be programmed or configured with the required logic to control any of the components, functions and processes of the vehicle V, including the braking system 10.

An alarm device 48 may be provided. This alarm device 48 would provide an alarm to the operator of the vehicle V based upon at least one condition or state of a component portion of the braking system 10. For example, an alarm may be provided that there are faults or operational failures in the braking system 10 (or brake interface circuit 16) based upon penalty data, processor data, current data, etc. The alarm or alarm condition may be caused, for example, by some failure in the brake interface circuit 16 that would indicate that an inappropriate penalty brake will be applied, or such a penalty brake cannot be applied even given the appropriate situation and existence of control parameters.

As also illustrated in FIG. 5, the braking system 10 may include a visual display device 50, which may be in communication with the on-board controller 46. The visual display device presents data to the operator of the vehicle V. In addition, the content of this data may represent conditions or states of at least one or more components of the braking system 10 or the overall operational condition of the vehicle V. For example, and as discussed above in connection with the alarm device 48, the data may be current data, processor data, penalty data, etc. provided in some textual, graphical or other form for use by the operator of the vehicle V.

Accordingly, the presently-invented braking system 10 and method provides redundant control of the braking arrangement BA, as well as the various components of the brake interface circuit 16, switches 18, 20, etc. The braking system 10 further allows for the appropriate testing of the circuitry and operability of various components of the braking system 10 and/or braking arrangement BA. In addition, the braking system 10 increases the likelihood of automated implementation of the braking arrangement BA under specified conditions and situations by including redundant control in electrical communication between the penalty power source 14 and the brake control arrangement 12. Still further, the various components can be tested, checked and monitored, and even independently controlled, to provide additional backup within the braking system 10 and brake interface circuit 16. The braking system 10 and method of the present invention can be used in connection with a variety of vehicles V, and may be particularly useful in connection with the complex braking arrangement BA and existing brake interface circuit 16 on a train. In this regard, the braking system 10 can be retrofitted to existing braking systems and arrangements, or can be used in connection with new vehicles V. Further, the various processors discussed above can be integrated or in appropriate communication in order to implement the inventive method.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A braking system, comprising:
   a brake control arrangement in operational communication with a braking arrangement configured to brake a vehicle; and
   a penalty power source configured to deliver current to the brake control arrangement through a brake interface circuit,
   wherein the brake interface circuit comprises:
   a main positive current switch in a path between the penalty power source and the brake control arrangement, the main positive current switch urged to a closed position and configured to open upon loss or interruption of a penalty hold-off signal; and
   a main negative current switch in a path between the penalty power source and the brake control arrangement, the main negative current switch urged to a closed position and configured to open upon loss or interruption of a penalty hold-off signal,
   wherein, upon opening of either of the main positive current switch or the main negative current switch, the braking arrangement will automatically brake the vehicle as controlled by the brake control arrangement.

2. The braking system of claim 1, further comprising at least one switch monitoring processor configured to control at least one of the main positive current switch and the main negative current switch.

3. The braking system of claim 2, wherein the at least one switch monitoring processor is configured to open or close the at least one of the main positive current switch and the main negative current switch.

4. The braking system of claim 3, further comprising at least one switch charge device configured to control at least one of the main positive current switch and the main negative current switch by applying a periodic charge thereto to urge the at least one of the main positive current switch and the main negative current switch to a closed position.

5. The braking system of claim 4, wherein the at least one switch monitoring processor is configured to monitor the periodic charge applied to the at least one of the main positive current switch and the main negative current switch.

6. The braking system of claim 3, wherein the at least one switch monitoring processor is configured to open the at least one of the main positive current switch and the main negative current switch based upon penalty data.

7. The braking system of claim 6, wherein the penalty data comprises at least one of the following: the amount of charge applied to a switch device, the duration of charge applied to a switch device, the frequency of charge applied to a switch device, the presence of charge, the absence of charge, a function of at least one component of the vehicle, a condition of at least one component of the vehicle, switch data, fault data, message data, processor data, on-board controller data, central dispatch system data, vehicle data, position data, condition data or any combination thereof.

8. The braking system of claim 3, further comprising:
   a first switch monitoring processor configured to monitor and control at least one of the main positive current switch and the main negative current switch; and
   a second switch monitoring processor configured to monitor and control at least one of the main positive current switch and the main negative current switch.

9. The braking system of claim 1, further comprising a decision processor in communication with the first switch monitoring processor and the second switch monitoring processor and configured to receive and process processor data based upon at least one of the first switch monitoring processor and the second switch monitoring processor.

10. The braking system of claim 1, further comprising an on-board controller positioned on the vehicle and in communication with at least one of the following: the braking system, the brake control arrangement, the braking arrangement, the penalty power source, the brake interface circuit, the main positive current switch, the main negative current switch, a switch monitoring process, a switch charge device, a sensor, an auxiliary positive current switch, an auxiliary negative current switch, a testing processor, an alarm device, a visual display device, a decision processor, a central dispatch system or any combination thereof.

11. The braking system of claim 1, further comprising:
an auxiliary positive current switch in a path between the penalty power source and the brake control arrangement and around the main positive current switch, the auxiliary positive current switch controllable between an open position and a closed position; and
an auxiliary negative current switch in a path between the penalty power source and the brake control arrangement and around the main negative current switch, the auxiliary negative current switch controllable between an open position and a closed position.

12. The braking system of claim 11, further comprising a testing processor configured to control the auxiliary positive current switch and the auxiliary negative current switch, such that the testing processor is configured to open or close the auxiliary positive current switch and the auxiliary negative current switch.

13. The braking system of claim 12, wherein the testing processor is further configured to control the main positive current switch and the main negative current switch, such that the testing processor is configured to open or close the main positive current switch and the main negative current switch.

14. The braking system of claim 12, wherein the testing processor is further configured to: (a) close the auxiliary positive current switch; (b) close the auxiliary negative current switch; and (c) transmit a request to open at least one of the main positive current switch and the main negative current switch.

15. The braking system of claim 14, further comprising:
a first main current sensor in communication with the testing processor and positioned in the path between the main positive current switch and the brake control arrangement, the first main current sensor configured to measure current in the path and provide current data to the testing processor; and
a second main current sensor in communication with the testing processor and positioned in a path between the main negative current switch and the brake control arrangement, the second main current sensor configured to measure current in the path and provide current data to the testing processor.

16. The braking system of claim 15, further comprising:
a first auxiliary current sensor in communication with the testing processor and positioned in the path between the auxiliary positive current switch and the brake control arrangement, the first auxiliary current sensor configured to measure current in the path and provide current data to the testing processor; and
a second auxiliary current sensor in communication with the testing processor and positioned in a path between the auxiliary negative current switch and the brake control arrangement, the second auxiliary current sensor configured to measure current in the path and provide current data to the testing processor.

17. The braking system of claim 16, wherein the testing processor is configured to:
close the auxiliary positive current switch;
obtain current data from the first auxiliary current sensor;
if the current data indicates the presence of appropriate current in the path between the auxiliary positive current switch and the brake control arrangement, transmit a request to open the main positive current switch; and
obtain current data from the first main current sensor.

18. The braking system of claim 16, wherein the testing processor is configured to:
close the auxiliary negative current switch;
obtain current data from the second auxiliary current sensor;
if the current data indicates the presence of appropriate current in the path between the auxiliary negative current switch and the brake control arrangement, transmit a request to open the main negative current switch; and
obtain current data from the second main current sensor.

19. The braking system of claim 1, further comprising an alarm device configured to provide an alarm to an operator of the vehicle based upon at least one condition or state of at least one component or portion of the system.

20. The braking system of claim 1, further comprising a visual display device configured to present data to an operator of the vehicle, the content of the data at least partially representing at least one condition or state of at least one component or portion of the system.

21. The braking system of claim 1, wherein the vehicle is at least one of the following: a train, a locomotive, an engine, a road vehicle, a truck, a car, a subway, a bus.

22. A method of controlling a braking system having a brake control arrangement in operational communication with a braking arrangement configured to brake a vehicle, the method comprising:
delivering current from a penalty power source to the brake control arrangement;
positioning a main positive current switch in a path between the penalty power source and the brake control arrangement;
urging a main positive current switch to a closed position;
upon loss or interruption of a penalty hold-off signal, actuating the main positive current switch to an open position;
urging a main negative current switch to a closed position;
upon loss or interruption of a penalty hold-off signal, actuating the main negative current switch to an open position;
upon opening of either of the main positive current switch or the main negative current switch, automatically braking the vehicle as controlled by the brake control arrangement.

23. A brake interface circuit for facilitating electrical communication between a brake control arrangement, which is in operational communication with a braking arrangement configured to brake a vehicle, and a penalty power source configured to deliver current to the brake control arrangement through the brake interface circuit, the brake interface circuit comprising:
a main positive current switch in a path between the penalty power source and the brake control arrangement, the main positive current switch urged to a closed position and configured to open upon loss or interruption of a penalty hold-off signal; and
a main negative current switch in a path between the penalty power source and the brake control arrangement, the main negative current switch urged to a closed position and configured to open upon loss or interruption of a penalty hold-off signal.

* * * * *